No. 685,386. Patented Oct. 29, 1901.
C. RAUHE.
SCREW VISE.
(Application filed Aug. 28, 1900.)

(No Model.)

Witnesses:
Arthur Zumpe
Edward Ray

Inventor:
Carl Rauhe
by his attorneys
Roeder & Brien

UNITED STATES PATENT OFFICE.

CARL RAUHE, OF DÜSSELDORF, GERMANY.

SCREW-VISE.

SPECIFICATION forming part of Letters Patent No. 685,386, dated October 29, 1901.

Application filed August 28, 1900. Serial No. 28,302. (No model.)

*To all whom it may concern:*

Be it known that I, CARL RAUHE, a citizen of the German Empire, and a resident of Düsseldorf, Germany, have invented certain new and useful Improvements in Screw-Vises, of which the following is a specification.

My invention refers to an improved screw-vise, which is illustrated by the accompanying drawings and affords the advantage that it may at the same time be used as a press which is worked by its screw and lever.

Figure 1:
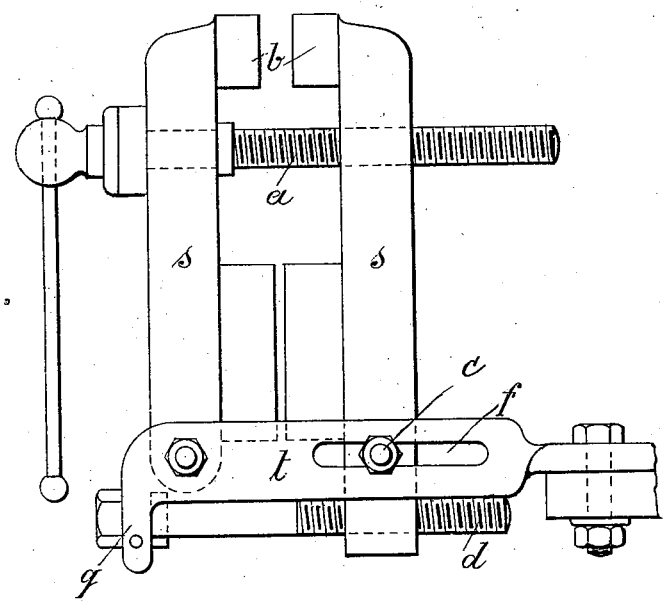
Figure 2:
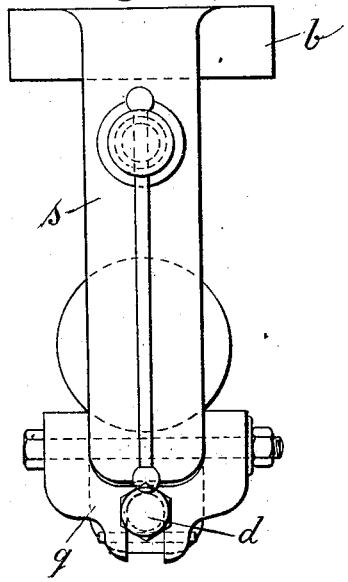

In the accompanying drawings, Figure 1 is a side view of my improved vise, and Fig. 2 an end view thereof.

The press, which is attached to the vise, may be applied in various ways. For instance, it may be used to advantage by dentists for the stamping out of metal plates for sets of artificial teeth or for any kind of stenciling, punching, or cutting. The lever and the screw, which are both working together, provide the required pressure. The two legs $s$ of the jaws $b$ are attached to one or two traverse-rails $t$ at some distance from each other. They may be fixed so that either one or both can be turned upon their pivots. The rails $t$ may at the same time be extended at the rear and be used for fixing the device to the table. Near the top of the legs there is arranged, in the way as is usually done with vises, a screw-spindle $a$. The legs $s$ may be adjustable on the rails in any way, so that the space between them may be changed agreeable to the uses to which the device is to be put when serving as a press.

In the device which is illustrated herewith the adjustment is done by a screw $d$, which rests in the transverse connecting-piece $q$ of the rails $t$ and engages in the thread of a screw-head on the leg of the rear jaw, which is lengthened downward. This jaw is kept in its place by a screw $c$, which is inserted in the slits $f$ of the rails $t$ and loosened and afterward tightened again when being adjusted. Normally the right-hand leg $s$ is rigidly clamped to the rails $t$ by means of the bolt $c$ and the left-hand leg $s$ is turned on its fulcrum by means of the screw $a$ in the usual manner. The screw $d$ has not for its function to support the right-hand leg, but merely to set the same at a suitable distance from the left-hand leg. If this adjustment is to be effected, the bolt $c$ is slackened, the screw $d$ manipulated, and the bolt again tightened up to lock the leg in its new position. If the device is to be used as a press, the press-plates are placed upon the rails $t$ between the legs $s$.

What I claim as my invention is the following:

A vise composed of a slotted rail, an adjustable jaw, a bolt for adjustably connecting said jaw to the rail-slot, a second jaw pivoted to the rail, a screw for tilting said pivoted jaw, and a screw-spindle tapped through the adjustable jaw and adapted to set the same with relation to the pivoted jaw, substantially as specified.

Signed by me at Düsseldorf, Germany, this 14th day of August, 1900.

CARL RAUHE.

Witnesses:
 WILLIAM ESSENWEIN,
 PETER LIEBER.